(12) United States Patent
Cheng et al.

(10) Patent No.: US 9,215,073 B2
(45) Date of Patent: Dec. 15, 2015

(54) KEY INSULATION METHOD AND DEVICE

(71) Applicant: Huawei Technologies Co., Ltd., Shenzhen, Guangdong (CN)

(72) Inventors: Xiangguo Cheng, Shenzhen (CN); Jia Yu, Shenzhen (CN); Qinqin Yang, Beijing (CN)

(73) Assignee: Huawei Technologies Co., Ltd., Shenzhen (CN)

(*) Notice: Subject to any disclaimer, the term of this patent is extended or adjusted under 35 U.S.C. 154(b) by 0 days.

(21) Appl. No.: 14/243,635

(22) Filed: Apr. 2, 2014

(65) Prior Publication Data
US 2014/0301554 A1 Oct. 9, 2014

(30) Foreign Application Priority Data

Apr. 8, 2013 (CN) .......................... 2013 1 0119342

(51) Int. Cl.
*H04L 9/32* (2006.01)
*H04L 9/08* (2006.01)

(52) U.S. Cl.
CPC .............. *H04L 9/3242* (2013.01); *H04L 9/088* (2013.01)

(58) Field of Classification Search
CPC .............................. H04L 9/3242; H04L 9/088
See application file for complete search history.

(56) References Cited

U.S. PATENT DOCUMENTS

| 8,270,615 | B2 | 9/2012 | Hanaoka |
| 2004/0123110 | A1* | 6/2004 | Zhang et al. .............. 713/176 |
| 2007/0230705 | A1* | 10/2007 | Hanaoka .................. 380/277 |
| 2007/0279227 | A1* | 12/2007 | Juels ..................... 340/572.1 |
| 2013/0143532 | A1 | 6/2013 | Liu |

FOREIGN PATENT DOCUMENTS

| CN | 1953395 A | 4/2007 |
| CN | 102348206 A | 2/2012 |
| CN | 103414557 A | 11/2013 |
| JP | 2004228615 A | 8/2004 |

OTHER PUBLICATIONS

"Protecting against Key Exposure: Strongly Key-Insulated Encryption with Optimal Threshold", https://eprint.iacr.org/2002/064.pdf Jun. 26, 2002.*

(Continued)

*Primary Examiner* — Andrew Nalven
*Assistant Examiner* — Mary Li
(74) *Attorney, Agent, or Firm* — Leydig, Voit & Mayer., Ltd.

(57) ABSTRACT

Embodiments of the present invention provide a key insulation method and device. The key insulation method includes: randomly selecting a first parameter s from $Z^*_q$, acquiring a helper initial key from a helper, and generating an initial user private key according to the first parameter s, a preset first cryptographic hash function $H_1$, and the helper initial key; and acquiring a helper updated key for a time segment i from the helper, and updating a user private key for a time segment j according to the helper updated key for the time segment i to obtain a user private key for the time segment i. According to the key insulation method and device provided by the embodiments, in a process of generating an initial key and a process of updating a key, lifecycle is not involved, which improves flexibility of a key system.

12 Claims, 4 Drawing Sheets

Randomly select a first parameter s from $Z^*_q$, acquire a helper initial key from a helper, and generate an initial user private key according to the first parameter s, a preset first cryptographic hash function $H_1$, and the helper initial key, where $Z^*_q = \{1, 2, ..., q-1\}$, q is a prime number, and the helper initial key is generated by the helper according to a helper private key and the first cryptographic hash function $H_1$" — A10

Acquire a helper updated key for a time segment i from the helper, and update a user private key for a time segment j according to the helper updated key for the time segment i to obtain a user private key for the time segment i, where i and j are integers, $i > j \geq 0$, an initial time segment is a time segment 0, the initial user private key is a user private key for the time segment 0, the helper updated key for the time segment i is obtained by updating a helper updated key for a time segment i-1 according to the first cryptographic hash function by the helper — A20

(56) References Cited

OTHER PUBLICATIONS

Zhu et al., "Improved Identity Based Key Insulation Signature Scheme," Computer Applications, vol. 28, No. 5, School of Mechanical Science and Engineering, Huazhong, China (May 2008).

Weng et al., "Identity-Based Key-Insulated Signature with Secure Key-Updates," Information Security and Cryptology, Second SKLOIS Conference, Inscrypt 2006, pp. 13-26, Springer Berlin Heidelberg, Berlin, Germany (Nov. 29-Dec. 1, 2006).

Dodis et al., "Key-Insulated Public-Key Cryptosystems," Advances in Cryptology—EUROCRYPT 2002, International Conference on the Theory and Applications of Cryptographic Techniques, pp. 65-82, Springer Berlin Heidelberg, Berlin, Germany (Apr. 28-May 2, 2002).

Weng et al., "Parallel Key-Insulated Signature: Framework and Construction," Journal of Shanghai Jiaotong University, vol. 13, Issue 1, pp. 6-11, Shanghai Jiaotong University Press, Shanghai, China (Feb. 1, 2008).

Dodis et al., "Strong Key-Insulated Signature Schemes," Proceedings of the $6^{th}$ International Workshop on Theory and Practice in Public Key Cryptography: Public Key Cryptography, pp. 1-15, International Association for Cryptologic Research, London, UK (2003).

Gonzalez-Deleito et al., "A New Key-Insulated Signature Scheme," International Conference on Information and Communications Security, Lecture Notes in Computer Science, vol. 3269, pp. 465-479, Springer Verlag, Berlin, Germany (2004).

* cited by examiner

KEY INSULATION METHOD AND DEVICE

CROSS-REFERENCE TO RELATED APPLICATIONS

This application claims priority to Chinese Patent Application No. 201310119342.0, filed with the Chinese Patent Office on Apr. 8, 2013, which is incorporated herein by reference in its entirety.

TECHNICAL FIELD

Embodiments of the present invention relate to the field of communications technologies, and in particular, to a key insulation method and device.

BACKGROUND

With the popularization of networks and continuous development of network technologies, an increasing number of cryptographic technologies are applied to portable low-security mobile devices, making it easy for an attacker to hack into such mobile devices and obtain keys. However, for a traditional cryptographic system totally dependent upon a key, once the key is exposed, all cryptographic operations relevant to the key become invalid. Therefore, as an effective method for reducing the risk of key exposure, a key self-protection technology is applied to an increasing number of fields.

The basic idea of a key insulation technology is to divide a private key of a user into two parts, namely, a temporary private key stored in a user equipment and a helper key stored in a helper device ("helper"). The user equipment has a great computing capability but low security, while the helper has a poor computing capability but high physical security. An entire lifecycle is divided into several time segments. In the entire system lifecycle, provided that a public key of the user remains unchanged, the temporary private key for each time segment is updated regularly through interaction between the user equipment and the helper. The user uses different temporary private keys in different time segments, so that exposure of a temporary private key in a certain time segment does not harm security in another time segment, thereby greatly reducing harm caused by key exposure.

During implementation, key insulation solutions in the prior art generally all require presetting a lifecycle of a key system. After the lifecycle ends, the key system cannot be used and is poor in flexibility.

SUMMARY

Embodiments of the present invention provide a key insulation method and device, to improve flexibility of a key system.

According to a first aspect, an embodiment of the present invention provides a key insulation method, including:

randomly selecting a first parameter s from $Z^*_q$, acquiring a helper initial key from a helper, and generating an initial user private key according to the first parameter s, a preset first cryptographic hash function $H_1$, and the helper initial key, where $Z^*_q = \{1, 2, \ldots, q-1\}$, q is a prime number, and the helper initial key is generated by the helper according to a helper private key and the first cryptographic hash function $H_1$; and acquiring a helper updated key for a time segment i from the helper, and updating a user private key for a time segment j according to the helper updated key for the time segment i to obtain a user private key for the time segment i, where i and j are integers, $i > j \geq 0$, an initial time segment is a time segment 0, the initial user private key is a user private key for the time segment 0, and the helper updated key for the time segment i is obtained by updating a helper updated key for a time segment i−1 according to the first cryptographic hash function $H_1$ by the helper.

In a first possible implementation manner, the helper initial key is $UK_0 = rH_1(0)$, where r is the helper private key, r is randomly selected from $Z^*_q$, $H_1$ is $\{0,1\}^* \rightarrow G_1$, $e: G_1 \times G_1 \rightarrow G_2$ is a bilinear pairing, and $G_1$ and $G_2$ are cyclic groups of an order q; and the generating an initial user private key according to the first parameter s, a first cryptographic hash function $H_1$, and the helper initial key is specifically:

generating the initial user private key $TSK_0$ by using the following formulas:

$$TSK_0 = (s, US_0); \text{ and}$$

$$US_0 = rH_1(0) + sH_1(0).$$

With reference to the first possible implementation manner of the first aspect, in a second possible implementation manner, the helper updated key for the time segment i is $UK_i = r(H_1(i) - H_1(i-1))$; and the updating a user private key for a time segment j according to the helper updated key for the time segment i to obtain a user private key for the time segment i is specifically:

obtaining the user private key $TSK_i$ for the time segment i by using the following formulas:

$$TSK_i = (s, US_i); \text{ and}$$

$$US_i = US_j + UK_i + s(H_1(i) - H_1(j)).$$

With reference to the first aspect or the first or second possible implementation manner of the first aspect, in a third possible implementation manner, after the randomly selecting a first parameter s from $Z^*_q$, the method further includes:

acquiring a helper public key from the helper, generating a user public key according to the first parameter s and the helper public key, and sending the generated user public key to a receiver device, where the helper public key is generated according to the helper private key.

With reference to the third possible implementation manner of the first aspect, in a fourth possible implementation manner, the helper public key is $PK_H = rP$, where P is a generator of $G_1$; and the generating a user public key according to the first parameter s and the helper public key is specifically:

generating the user public key PK by using the following formulas:

$$PK = (PK_H, P_{pub}); \text{ and}$$

$$P_{pub} = sP.$$

With reference to the fourth possible implementation manner of the first aspect, in a fifth possible implementation manner, after the sending the generated user public key to a receiver device, the method further includes:

signing, according to the user private key for the time segment i, a received message which is to be signed, and sending the signed message to the receiver device, so that the receiver device authenticates the signed message according to the user public key.

With reference to the fifth possible implementation manner of the first aspect, in a sixth possible implementation manner, the signing, according to the user private key for the time segment i, a received message which is to be signed, and sending the signed message to the receiver device, so that the receiver device authenticates the signed message according to the user public key is specifically:

generating a signature σ for the message m, which is to be signed, according to the time segment i by using the following formulas:

$$\sigma=(i,U,V); \text{ and}$$

$U=uP$, $V=US_i+uP_m$, and $P_m=H_2(i,m,U)$, where u is a number randomly selected from $Z^*_q$, $H_2$ is a second cryptographic hash function, and $H_2$ is $\{0,1\}^*\times\{0,1\}^*\times G_1\rightarrow G_1$; and sending the signed message m and the signature σ to the receiver device, so that the receiver device calculates $P'_m=H_2(i,m,U)$ according to the user public key PK, the time segment i, the signed message m, and the signature σ, and the authentication succeeds if $e(P,V)=e(PK_H+P_{pub},H_1(i))\cdot e(U, P'_m)$ is satisfied, where $e:G_1\times G_1\rightarrow G_2$ is a bilinear pairing.

According to a second aspect, an embodiment of the present invention provides a key insulation method, including:

randomly selecting a second parameter r from $Z^*_q$, generating a helper private key according to the second parameter r, generating a helper initial key according to the helper private key and a preset first cryptographic hash function $H_1$, and sending the helper initial key to a user equipment, so that the user equipment generates an initial user private key according to the helper initial key, where $Z^*_q=\{1, 2, \ldots, q-1\}$, and q is a prime number; and updating a helper updated key for a time segment i−1 according to the first cryptographic hash function $H_1$ to obtain a helper updated key for a time segment i, and sending the helper updated key for the time segment i to the user equipment, so that the user equipment updates a user private key according to the helper updated key, where i is an integer, i>0, an initial time segment is a time segment 0, and the helper initial key is a helper updated key for the time segment 0.

In a first possible implementation manner, the generating a helper private key according to the second parameter r, and generating a helper initial key according to the helper private key and a first cryptographic hash function $H_1$ is specifically:

generating the helper initial key $UK_0$ by using the following formulas:

helper private key $HK=r$; and $UK_0=rH_1(0)$, where $H_1$ is $\{0,1\}^*\rightarrow G_1$, $e:G_1\times\rightarrow G_2$ is a bilinear pairing, and $G_1$ and $G_2$ are cyclic groups of an order q.

With reference to the first possible implementation manner of the second aspect, in a second possible implementation manner, the updating a helper updated key for a time segment i−1 according to the first cryptographic hash function $H_1$ to obtain a helper updated key for a time segment i is specifically:

obtaining the helper updated key $UK_i$ for the time segment i by using the following formula:

$$UK_i=r(H_1(i)-H_1(i-1)).$$

According to a third aspect, an embodiment of the present invention provides a user equipment, including:

an initial key generating unit, configured to randomly select a first parameter s from $Z^*_q$, acquire a helper initial key from a helper, and generate an initial user private key according to the first parameter s, a preset first cryptographic hash function $H_1$, and the helper initial key, where $Z^*_q=\{1, 2, \ldots, q-1\}$, q is a prime number, and the helper initial key is generated by the helper according to a helper private key and the first cryptographic hash function $H_1$; and a key updating unit, configured to acquire a helper updated key for a time segment i from the helper, and update a user private key for a time segment j according to the helper updated key for the time segment i to obtain a user private key for the time segment i, where i and j are integers, i>j≥0, an initial time segment is a time segment 0, the initial user private key is a user private key for the time segment 0, and the helper updated key for the time segment i is obtained by updating a helper updated key for a time segment i−1 according to the first cryptographic hash function $H_1$ by the helper.

In a first possible implementation manner, the helper initial key is $UK_0=rH_1(0)$, where r is the helper private key, r is randomly selected from $Z^*_q$, $H_1$ is $\{0,1\}^*\rightarrow G_1$, $e:G_1\rightarrow G_1\rightarrow G_2$ is a bilinear pairing, and $G_1$ and $G_2$ are cyclic groups of an order q; and the initial key generating unit is specifically configured to generate the initial user private key $TSK_0$ by using the following formulas:

$$TSK_0=(s,US_0); \text{ and}$$

$$US_0=rH_1(0)+sH_1(0).$$

With reference to the first possible implementation manner of the third aspect, in a second possible implementation manner, the helper updated key for the time segment i is $UK_i=r(H_1(i)-H_1(i-1))$; and the key updating unit is specifically configured to obtain the user private key $TSK_i$ for the time segment i by using the following formulas:

$$TSK_i=(s,US_i); \text{ and}$$

$$US_i=US_j+UK_i+s(H_1(i)-H_1(j)).$$

With reference to the third aspect or the first or second possible implementation manner of the third aspect, in a third possible implementation manner, the initial key generating unit is further configured to acquire a helper public key from the helper, generate a user public key according to the first parameter s and the helper public key, and send the generated user public key to a receiver device, where the helper public key is generated according to the helper private key.

With reference to the third possible implementation manner of the third aspect, in a fourth possible implementation manner, the helper public key is $PK_H=rP$, where P is a generator of $G_1$; and the initial key generating unit is specifically configured to generate the user public key PK by using the following formulas:

$$PK=(PK_H,P_{pub}); \text{ and}$$

$$P_{pub}=sP.$$

With reference to the fourth possible implementation manner of the third aspect, in a fifth possible implementation manner, the user equipment further includes:

a signing unit, configured to sign, according to the user private key for the time segment i, a received message which is to be signed, and send the signed message to the receiver device, so that the receiver device authenticates the signed message according to the user public key.

With reference to the fifth possible implementation manner of the third aspect, in a sixth possible implementation manner, the signing unit is specifically configured to generate a signature σ for the message m, which is to be signed, according to the time segment i by using the following formulas:

$$\sigma=(i,U,V); \text{ and}$$

$U=uP$, $V=US_i+uP_m$, and $P_m=H_2(i,m,U)$, where u is a number randomly selected from $Z^*_q$, $H_2$ is a second cryptographic hash function, and $H_2$ is $\{0,1\}^*\times\{0,1\}^*\times G_1\rightarrow G_1$; and send the signed message m and the signature σ to the receiver device, so that the receiver device calculates $P'_m=H_2(i,m,U)$ according to the user public key PK, the time segment i, the signed message m, and the signature σ, and the authentication succeeds if $e(P,V)=e(PK_H+P_{pub}, H_1(i))\cdot e(U,P'_m)$ is satisfied, where $e:G_1 = G_1 \rightarrow G_2$ is a bilinear pairing.

According to a fourth aspect, an embodiment of the present invention provides a helper, including:

an initial key generating unit, configured to randomly select a second parameter r from $Z^*_q$, generate a helper private key according to the second parameter r, generate a helper initial key according to the helper private key and a preset first cryptographic hash function $H_1$, and send the helper initial key to a user equipment, so that the user equipment generates an initial user private key according to the helper initial key, where $Z^*_q = \{1, 2, \ldots, q-1\}$, and q is a prime number; and a key updating unit, configured to update a helper updated key for a time segment i–1 according to the first cryptographic hash function $H_1$ to obtain a helper updated key for a time segment i, and send the helper updated key for the time segment i to the user equipment, so that the user equipment updates a user private key according to the helper updated key, where i is an integer, i>0, an initial time segment is a time segment 0, and the helper initial key is a helper updated key for the time segment 0.

In a first possible implementation manner, the initial key generating unit is specifically configured to generate the helper initial key $UK_0$ by using the following formulas:

helper private key HK=r; and $UK_0=rH_1(0)$, where $H_1$ is $\{0,1\}^* \rightarrow G_1$, $e:G_1 \times G_1 \rightarrow G_2$ is a bilinear pairing, and $G_1$ and $G_2$ are cyclic groups of an order q.

With reference to the first possible implementation manner of the fourth aspect, in a second possible implementation manner, the key updating unit is specifically configured to obtain the helper updated key $UK_i$ for the time segment i by using the following formula:

$$UK_i = r(H_1(i) - H_1(i-1)).$$

It can be known from the foregoing technical solutions that, according to the key insulation method and device provided by the embodiments of the present invention, in the process of generating the initial key and the process of updating the key, lifecycle is not involved, only the current time segment i and the previous time segment j are involved, and the two time segments are not necessarily two adjacent time segments, that is, no hard constraint is imposed. During operation of a key system, the life cycle of the key system can be changed freely according to a requirement of an actual application environment, which improves flexibility of the key system.

BRIEF DESCRIPTION OF DRAWINGS

To describe the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DESCRIPTION OF EMBODIMENTS

In order to make the objectives, technical solutions, and advantages of the present invention more comprehensible, the technical solutions according to the embodiments of the present invention are clearly described in the following with reference to the accompanying drawings. Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
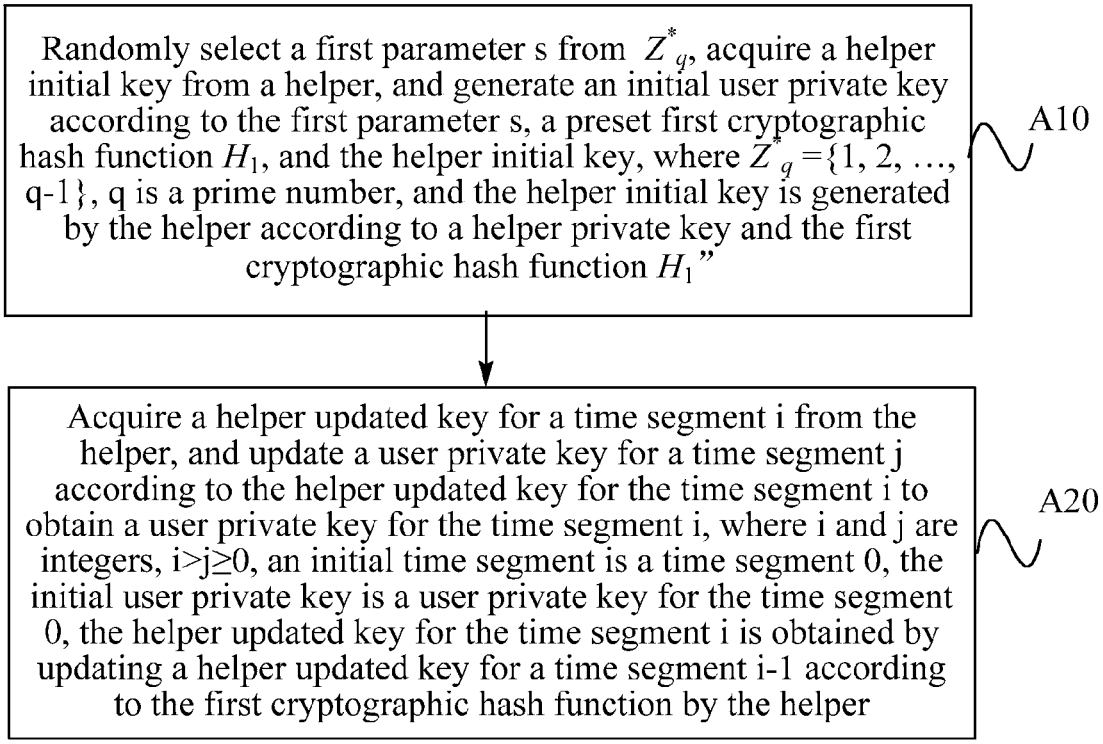
FIG. 1 is a flowchart of a first key insulation method according to an embodiment of the present invention.

FIG. 1 is a flowchart of a first key insulation method according to an embodiment of the present invention. As shown in FIG. 1, the key insulation method provided by this embodiment may specifically be executed by a user equipment, and the user equipment may be an electronic device such as a mobile phone, a personal computer, a notebook computer, or a tablet computer. The key insulation method provided by this embodiment specifically includes:

Step A10: Randomly select a first parameter s from $Z^*_q$, acquire a helper initial key from a helper, and generate an initial user private key according to the first parameter s, a preset first cryptographic hash function $H_1$, and the helper initial key, where $Z^*_q = \{1, 2, \ldots, q-1\}$, q is a prime number, and the helper initial key is generated by the helper according to a helper private key and the first cryptographic hash function $H_1$.

Specifically, a user equipment generates a user public key and a user private key, and updates the private key regularly or in response to a request from a helper or a service application. The helper is a device with relatively high physical security. The helper can generate a helper private key, a helper public key, and a helper key, and update the helper key regularly or in response to a request from the user equipment. At an initial moment of a key system, the helper generates a helper initial key according to the helper private key and the first cryptographic hash function $H_1$. The user equipment actively requests the helper initial key from the helper, or the helper may actively send the helper initial key to the user equipment by using an update message. If different time segments are defined according to the progression of time, the initial moment may be represented by a time segment 0.

$Z^*_q = \{1, 2, \ldots, q-1\}$, where q is a prime number. The user equipment randomly selects a first parameter s from $Z^*_q$, namely, $s \in_R Z^*_q$, and generates an initial user private key according to the first parameter s, the first cryptographic hash function $H_1$, and the helper initial key.

Step A20: Acquire a helper updated key for a time segment i from the helper, and update a user private key for a time segment j according to the helper updated key for the time segment i to obtain a user private key for the time segment i, where i and j are integers, i>j≥0, an initial time segment is a time segment 0, the initial user private key is a user private key for the time segment 0, and the helper updated key for the time segment i is obtained by updating a helper updated key for a time segment i−1 according to the first cryptographic hash function $H_1$ by the helper.

Specifically, in the time segment i, when the helper key in the helper needs to be updated, a new key may be generated according to the helper updated key for the time segment i−1. In a specific implementation process, the helper may obtain the helper updated key for the time segment i by updating the helper updated key for the time segment i−1 according to the first cryptographic hash function $H_1$. In the time segment i, when the user equipment needs to update the user private key, the user equipment may actively request the helper updated key for the time segment i from the helper, or the helper may send the helper updated key for the time segment i to the user equipment by using an update message, so as to trigger a private key updating process of the user equipment. The user equipment updates the user private key for the time segment j according to the helper updated key for the time segment i to obtain the user private key for the time segment i.

According to the key insulation method provided by this embodiment, in the process of generating the initial user private key and the process of updating the user private key, lifecycle is not involved, only the current time segment i and the previous time segment j are involved, and the two time segments are not necessarily two adjacent time segments, that is, no hard constraint is imposed. During operation of a key system, the life cycle of the key system can be changed freely according to a requirement of an actual application environment, which improves flexibility of the key system.

In this embodiment, the helper initial key is $UK_0=rH_1(0)$, where r is the helper private key, r is randomly selected from $Z^*_q$, $H_1$ is $\{0,1\}^* \to G_1$, $e: G_1 \times G_1 \to G_2$ is a bilinear pairing, and $G_1$ and $G_2$ are cyclic groups of an order q; and the generating an initial user private key according to the first parameter s, a first cryptographic hash function $H_1$, and the helper initial key in step A10 is specifically:

generating the initial user private key $TSK_0$ by using the following formulas:

$$TSK_0=(s,US_0); \text{ and}$$

$$US_0=rH_1(0)+sH_1(0).$$

Specifically, the helper randomly selects a second parameter r from $Z^*_q$, namely, $r \in_R Z^*_q$, and the helper generates a helper private key according to the second parameter r, for example, the helper private key is r. Then, the helper generates a helper initial key $UK_0=rH_1(0)$ according to the helper private key and the first cryptographic hash function $H_1$. $G_1$ and $G_2$ are two cyclic groups of an order q, P is a generator of $G_1$, $e:G_1 \times G_1 \to G_2$ is a bilinear pairing, and the first cryptographic hash function $H_1$ is $\{0,1\}^* \to G_1$, and is used for mapping a string of 0s and 1s to an element of $G_1$. Because a bilinear pairing is derived from a Weil pairing or a Tate pairing on some special elliptic curves, signature schemes based on elliptic curves generally have advantages such as being short in the length of a key and a signature. Compared with an RSA (Rivest-Shamir-Adleman) encryption algorithm, when an RSA security factor is a length of 1024 bits, coordinates of each point in the group $G_1$ only requires a length of about 170 bits to be as secure as that in the RSA.

Because the helper key and the user private key are an integer in $Z^*_q$ and an element in the group $G_1$, respectively, the keys have a fixed length and are both unrelated to the lifecycle of the key system, which ensures that the key length does not increase linearly with an increase in the life cycle.

In this embodiment, the helper updated key for the time segment i is $UK_i=r(H_1(i)-H_1(i-1))$; and the updating a user private key for a time segment j according to the helper updated key for the time segment i to obtain a user private key for the time segment i in step A20 is specifically:

obtaining the user private key $TSK_i$ for the time segment i by using the following formulas:

$$TSK_i=(s,US_i); \text{ and}$$

$$US_i=US_j+UK_i+s(H_1(i)-H_1(j)).$$

Figure 2:
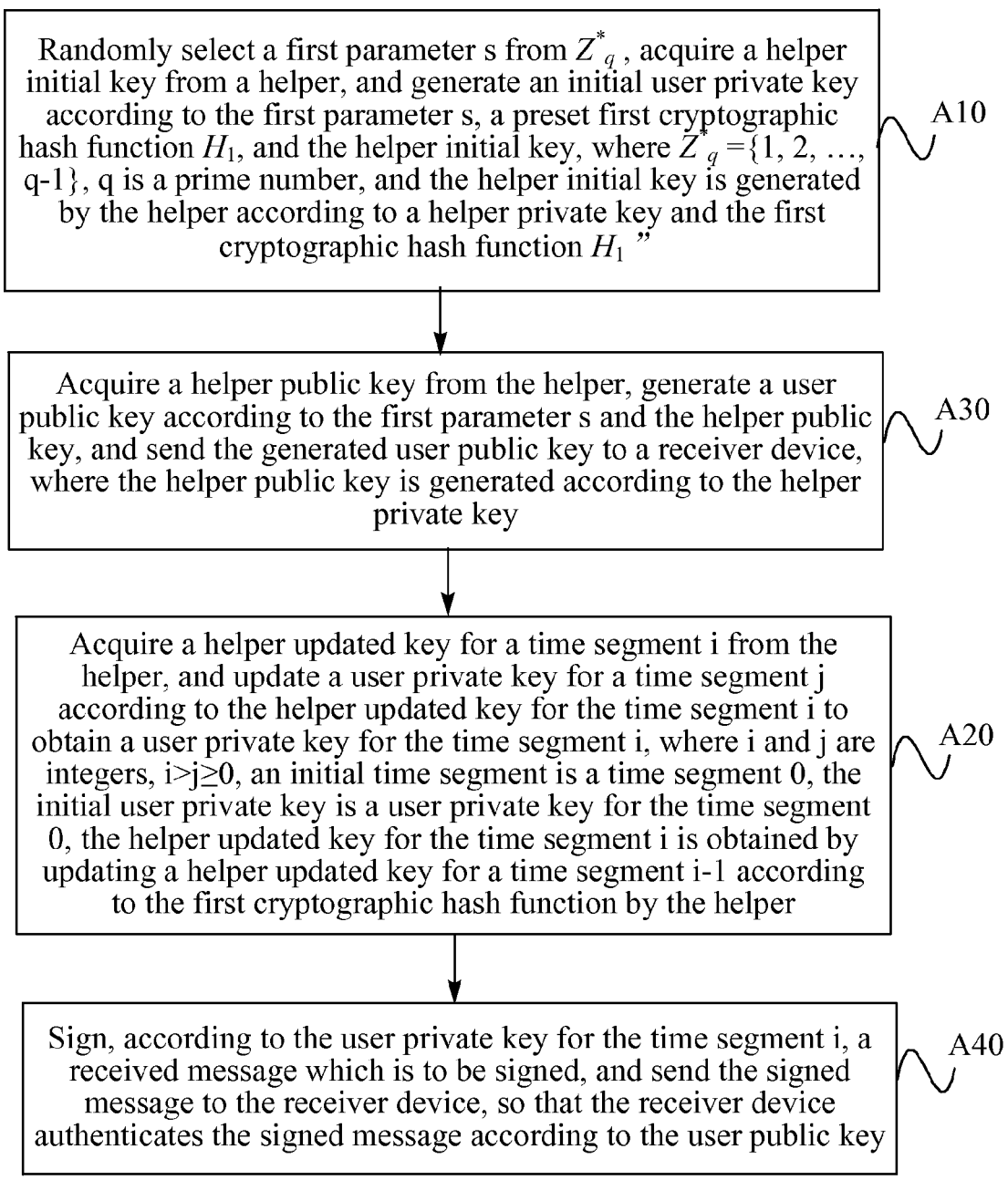
FIG. 2 is a flowchart of a second key insulation method according to an embodiment of the present invention.

FIG. 2 is a flowchart of a second key insulation method according to an embodiment of the present invention. As shown in FIG. 2, in this embodiment, after the randomly selecting a first parameter s from $Z^*_q$ in step A10, the method may further include:

Step A30: Acquire a helper public key from the helper, generate a user public key according to the first parameter s and the helper public key, and send the generated user public key to a receiver device, where the helper public key is generated according to the helper private key.

Specifically, the user equipment also generates a user public key, and publicizes the user public key. The user equipment may send the user public key to a receiver device, and the receiver device is specifically a device working with the user equipment to implement message encryption or message authentication. For example, in an encryption process, the user equipment sends the user public key to a message sender device; the message sender device encrypts a message by using the user public key and sends the message to the user equipment; and the user equipment decrypts the message by using a user private key. In an identity authentication process, the user equipment sends the user public key to an authenticator device; the user equipment signs a message by using the user private key, and sends the signed message to the authenticator device; and the authenticator device authenticates the signature by using the user public key.

In this embodiment, the helper public key is $PK_H=rP$, where P is a generator of $G_1$; and the generating a user public key according to the first parameter s and the helper public key in step A30 is specifically:

generating the user public key PK by using the following formulas:

$$PK=(PK_H,P_{pub}); \text{ and}$$

$$P_{pub}=sP.$$

Because the user public key is also an integer in $Z^*_q$ an element in the group $G_1$, the user public key has a fixed length and is short. The user public key is unrelated to the lifecycle of the key system, which ensures that the length of the user public key does not increase linearly with an increase in the life cycle.

In this embodiment, after the sending the generated user public key to a receiver device in step A30, the method may further include:

Step A40: Sign, according to the user private key for the time segment i, a received message which is to be signed, and send the signed message to the receiver device, so that the receiver device authenticates the signed message according to the user public key.

In this embodiment, the signing, according to the user private key for the time segment i, a received message which is to be signed, and sending the signed message to the receiver device, so that the receiver device authenticates the signed message according to the user public key in step A40 is specifically:

generating a signature σ for the message m, which is to be signed, according to the time segment i by using the following formulas:

$$\sigma=(i,U,V); \text{ and}$$

$U=uP$, $V=US_i+uP_m$, and $P_m=H_2$ (i,m,U), where u is a number randomly selected from $Z^*_q$, $H_2$ is a second cryptographic hash function, and $H_2$ is $\{0,1\}^* \times \{0,1\}^* \times G_1 \to G_1$; and sending the signed message m and the signature σ to the receiver device, so that the receiver device calculates $P'_m=H_2$ (i,m,U) according to the user public key PK, the time segment i, the signed message m, and the signature σ, and the authentication succeeds if $e(P,V)=e(PK_H+P_{pub},H_1(i))\cdot e(U,P'_m)$ is satisfied, where $e:G_1 \times G_1 \to G_2$ is a bilinear pairing.

Specifically, the second cryptographic hash function $H_2$ is $\{0,1\}^* \times \{0,1\}^* \times G_1 \to G_1$, and is used for mapping a Cartesian product of two strings of 0s and 1s and the group $G_1$ to an element of the group $G_1$. The signature generated by using the foregoing formulas is short in length and unrelated to the number of time segments for key insulation, and requires a relatively small storage space and transmission bandwidth, and therefore is more applicable to a mobile device.

Because the foregoing authentication process only requires performing an addition operation, a scalar multiplication operation, and a Weil pairing operation on points on an elliptic curve and is unrelated to the number of time segments, complexity does not increase as time goes on.

Figure 3:
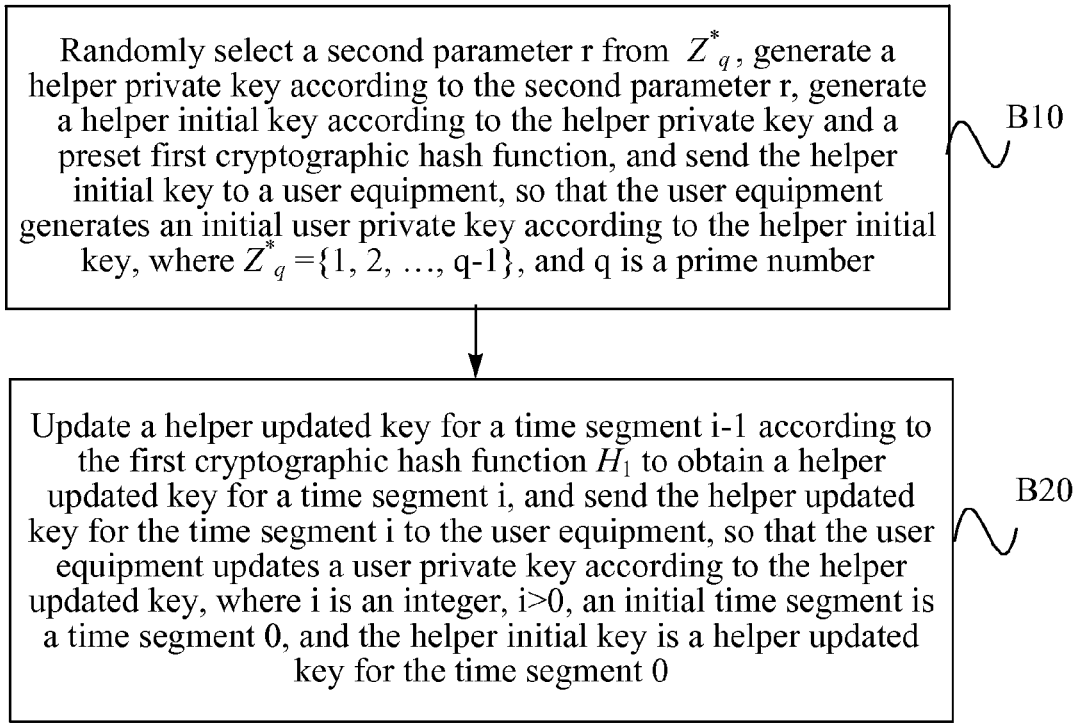
FIG. 3 is a flowchart of a third key insulation method according to an embodiment of the present invention.

FIG. 3 is a flowchart of a third key insulation method according to this embodiment. As shown in FIG. 3, the key insulation method provided by this embodiment may specifically be implemented along with a key insulation method applicable to a user equipment. A specific implementation process is not repeatedly described herein. The key insulation method provided by this embodiment may be executed by a helper. The helper is a device with relatively high physical security. The key insulation method provided by this embodiment includes:

Step B10: Randomly select a second parameter r from $Z^*_q$, generate a helper private key according to the second parameter r, generate a helper initial key according to the helper private key and a preset first cryptographic hash function $H_1$, and send the helper initial key to a user equipment, so that the user equipment generates an initial user private key according to the helper initial key, where $Z^*_q=\{1, 2, \ldots, q-1\}$, and q is a prime number.

Step B20: Update a helper updated key for a time segment i−1 according to the first cryptographic hash function $H_1$ to obtain a helper updated key for a time segment i, and send the helper updated key for the time segment i to the user equipment, so that the user equipment updates a user private key according to the helper updated key, where i is an integer, i>0, an initial time segment is a time segment 0, and the helper initial key is a helper updated key for the time segment 0.

According to the key insulation method provided by this embodiment, in the process of generating the helper initial key and the process of updating the helper key, lifecycle is not involved, only the current time segment i and the previous time segment j are involved, and the two time segments are not necessarily two adjacent time segments, that is, no hard constraint is imposed. During operation of a key system, the life cycle of the key system can be changed freely according to a requirement of an actual application environment, which improves flexibility of the key system.

In this embodiment, the generating a helper private key according to the second parameter r, and generating a helper initial key according to the helper private key and a first cryptographic hash function $H_1$ in step B10 is specifically:

generating the helper initial key $UK_0$ by using the following formulas:

helper private key HK=r; and $UK_0=rH_1(0)$, where $H_1$ is $\{0,1\}^* \to G_1$, $e:G_1 \times G_1 \to G_2$ is a bilinear pairing, and $G_1$ and $G_2$ are cyclic groups of an order q.

In this embodiment, the updating a helper updated key for a time segment i−1 according to the first cryptographic hash function $H_1$ to obtain a helper updated key for a time segment i in step B20 is specifically:

obtaining the helper updated key $UK_i$ for the time segment i by using the following formula:

$$UK_i=r(H_1(i)-H_1(i-1)).$$

Figure 4:
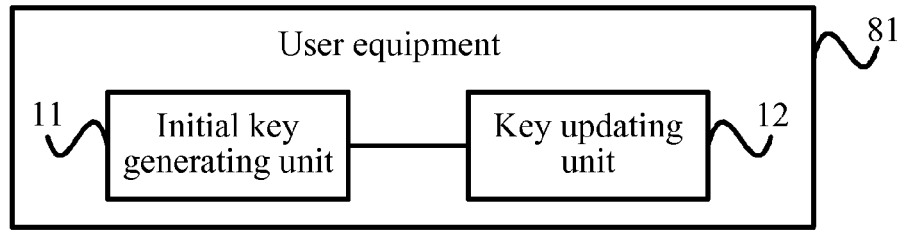
FIG. 4 is a schematic structural diagram of a first user equipment according to an embodiment of the present invention.

FIG. 4 is a schematic structural diagram of a first user equipment according to an embodiment of the present invention. As shown in FIG. 4, the user equipment 81 provided by this embodiment may specifically implement steps of a key insulation method applicable to a user equipment that is provided by any embodiment of the present invention. A specific implementation process is not repeatedly described herein.

The user equipment 81 provided by this embodiment specifically includes:

an initial key generating unit 11, configured to randomly select a first parameter s from $Z^*_q$, acquire a helper initial key from a helper, and generate an initial user private key according to the first parameter s, a preset first cryptographic hash function $H_1$, and the helper initial key, where $Z^*_q=\{1, 2, \ldots, q-1\}$, q is a prime number, and the helper initial key is generated by the helper according to a helper private key and the first cryptographic hash function $H_1$; and a key updating unit 12, configured to acquire a helper updated key for a time segment i from the helper, and update a user private key for a time segment j according to the helper updated key for the time segment i to obtain a user private key for the time segment i, where i and j are integers, i>j≥0, an initial time segment is a time segment 0, the initial user private key is a user private key for the time segment 0, and the helper updated key for the time segment i is obtained by updating a helper updated key for a time segment i−1 according to the first cryptographic hash function $H_1$ by the helper.

According to the user equipment 81 provided by this embodiment, in the process of generating the initial user private key and the process of updating the user private key, lifecycle is not involved, only the current time segment i and the previous time segment j are involved, and the two time segments are not necessarily two adjacent time segments, that is, no hard constraint is imposed. During operation of a key system, the life cycle of the key system can be changed freely according to a requirement of an actual application environment, which improves flexibility of the key system.

In this embodiment, the helper initial key is $UK_0=rH_1(0)$, where r is the helper private key, r is randomly selected from $Z^*_q$, $H_1$ is $\{0,1\}^* \to G_1$, $e:G_1 \times G_1 \to G_2$ is a bilinear pairing, and $G_1$ and $G_2$ are cyclic groups of an order q; and the initial key generating unit 11 is specifically configured to generate the initial user private key $TSK_0$ by using the following formulas:

$$TSK_0=(s,US_0); \text{ and}$$

$$US_0=rH_1(0)+sH_1(0).$$

In this embodiment, the helper updated key for the time segment i is $UK_i=r(H_1(i)-H_1(i-1))$; and the key updating unit 12 is specifically configured to obtain the user private key $TSK_i$ for the time segment i by using the following formulas:

$$TSK_i=(s, US_i); \text{ and}$$

$$US_i=US_j+UK_i+s(H_1(i)-H_1(j)).$$

In this embodiment, the initial key generating unit 11 is further configured to acquire a helper public key from the helper, generate a user public key according to the first parameter s and the helper public key, and send the generated user public key to a receiver device, where the helper public key is generated according to the helper private key.

In this embodiment, the helper public key is $PK_H=rP$, where P is a generator of $G_1$; and the initial key generating unit 11 is specifically configured to generate the user public key PK by using the following formulas:

$$PK=(PK_H, P_{pub}); \text{ and}$$

$$P_{pub}=sP.$$

Figure 5:
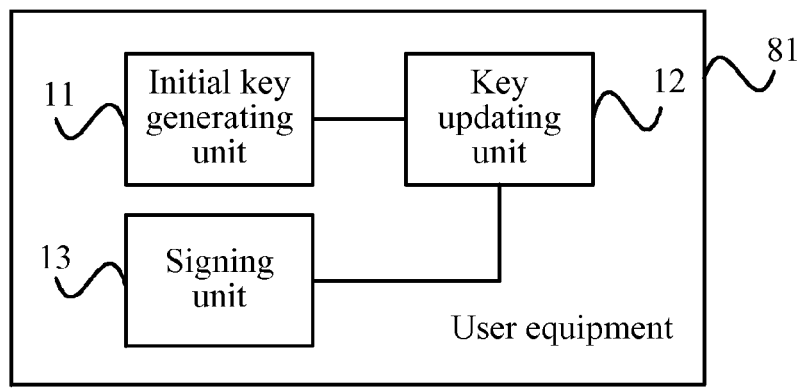
FIG. 5 is a schematic structural diagram of a second user equipment according to an embodiment of the present invention.

FIG. 5 is a schematic structural diagram of a second user equipment according to an embodiment of the present invention. As shown in FIG. 5, in this embodiment, further, the user equipment 81 may further include:

a signing unit 13, configured to sign, according to the user private key for the time segment i, a received message which is to be signed, and send the signed message to the receiver device, so that the receiver device authenticates the signed message according to the user public key.

In this embodiment, the signing unit 13 is specifically configured to generate a signature σ for the message m, which is to be signed, according to the time segment i by using the following formulas:

$$\sigma=(i,U,V); \text{ and}$$

$U=uP$, $V=US_i+uP_m$, and $P_m=H_2(i,m,U)$, where u is a number randomly selected from $Z^*_q$, $H_2$ is a second cryptographic hash function, and $H_2$ is $\{0,1\}^*\times\{0,1\}^*\times G_1\to G_1$; and send the signed message m and the signature σ to the receiver device, so that the receiver device calculates $P'_m=H_2(i,m,U)$ according to the user public key PK, the time segment i, the signed message m, and the signature σ, and the authentication succeeds if $e(P,V)=e(PK_H,P_{pub},H_1(i))\cdot e(U,P'_m)$ is satisfied, where $e:G_1\times G_1\to G_2$ is a bilinear pairing.

Figure 6:
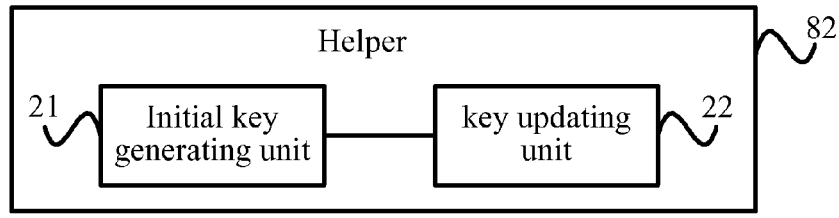
FIG. 6 is a schematic structural diagram of a first helper according to an embodiment of the present invention.

FIG. 6 is a schematic structural diagram of a first helper according to an embodiment of the present invention. As shown in FIG. 6, the helper 82 provided by this embodiment may specifically implement steps of a key insulation method applicable to a helper that is provided by any embodiment of the present invention. A specific implementation process is not repeatedly described herein.

The helper 82 provided by this embodiment specifically includes:

an initial key generating unit 21, configured to randomly select a second parameter r from $Z^*_q$, generate a helper private key according to the second parameter r, generate a helper initial key according to the helper private key and a preset first cryptographic hash function $H_1$, and send the helper initial key to a user equipment, so that the user equipment generates an initial user private key according to the helper initial key, where $Z^*_q=\{1, 2, \ldots, q-1\}$, and q is a prime number; and a key updating unit 22, configured to update a helper updated key for a time segment i-1 according to the first cryptographic hash function $H_1$ to obtain a helper updated key for a time segment i, and send the helper updated key for the time segment i to the user equipment, so that the user equipment updates a user private key according to the helper updated key, where i is an integer, i>0, an initial time segment is a time segment 0, and the helper initial key is a helper updated key for the time segment 0.

For the helper 82 provided by this embodiment, in the process of generating the helper initial key and the process of updating the helper key, only the current time segment i and the previous time segment j are involved, and the two time segments are not necessarily two adjacent time segments, that is, no hard constraint is imposed. During operation of a key system, the life cycle of the key system can be changed freely according to a requirement of an actual application environment, which improves flexibility of the key system.

In this embodiment, the initial key generating unit 21 is specifically configured to generate the helper initial key $UK_0$ by using the following formulas:

helper private key $HK=r$; and $UK_0=rH_1(0)$, where $H_1$ is $\{0,1\}^*\to G_1$, $e:G_1\times G_1\to G_2$ is a bilinear pairing, and $G_1$ and $G_2$ are cyclic groups of an order q.

In this embodiment, the key updating unit 22 is specifically configured to obtain the helper updated key $UK_i$ for the time segment i by using the following formula:

$$UK_i=r(H_1(i)-H_1(i-1)).$$

Figure 7:
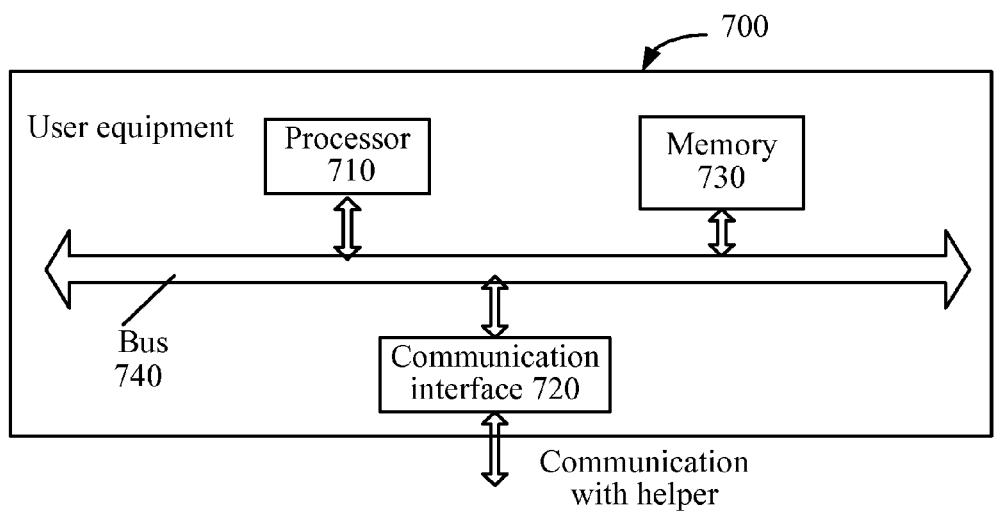
FIG. 7 is a schematic structural diagram of a third user equipment according to an embodiment of the present invention.

FIG. 7 is a schematic structural diagram of a third user equipment according to an embodiment of the present invention. As shown in FIG. 7, the user equipment 700 provided by this embodiment may specifically implement steps of a key insulation method applicable to a user equipment that is provided by any embodiment of the present invention. A specific implementation process is not repeatedly described herein.

The user equipment 700 provided by this embodiment specifically includes: a processor 710, a communication interface 720, a memory 730, and a bus 740, where the processor 710, the communication interface 720, and the memory 730 communicate with each other through the bus 740. The communication interface 720 is configured to acquire a helper initial key from a helper, and acquire a helper updated key for a time segment i from the helper. The memory 730 is configured to store an instruction. The processor 710 is configured to execute the instruction stored in the memory 730, where the processor 710 is configured to: randomly select a first parameter s from $Z^*_q$, and generate an initial user private key according to the first parameter s, a preset first cryptographic hash function $H_1$, and the helper initial key, where $Z^*_q=\{1, 2, \ldots, q-1\}$, q is a prime number, and the helper initial key is generated by the helper according to a helper private key and the first cryptographic hash function $H_1$; and update a user private key for a time segment j according to the helper updated key for the time segment i to obtain a user private key for the time segment i, where i and j are integers, i>j≥0, an initial time segment is a time segment 0, the initial user private key is a user private key for the time segment 0, and the helper updated key for the time segment i is obtained by updating a helper updated key for a time segment i-1 according to the first cryptographic hash function $H_1$ by the helper.

Figure 8:
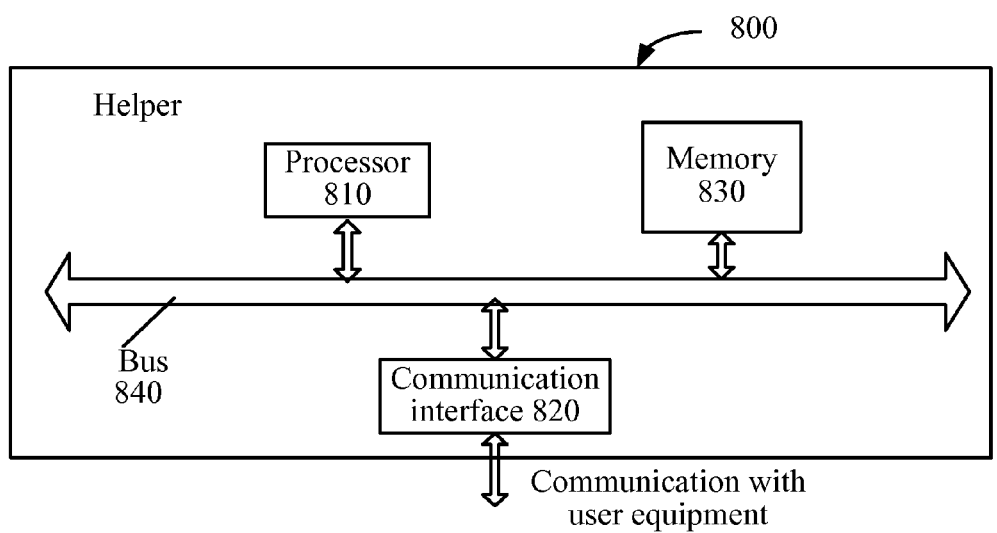
FIG. 8 is a schematic structural diagram of a second helper according to an embodiment of the present invention.

FIG. 8 is a schematic structural diagram of a second helper according to an embodiment of the present invention. As shown in FIG. 8, the helper 800 provided by this embodiment may specifically implement steps of a key insulation method applicable to a helper that is provided by any embodiment of the present invention. A specific implementation process is not repeatedly described herein.

The helper 800 provided by this embodiment specifically includes: a processor 810, a communication interface 820, a memory 830, and a bus 840, where the processor 810, the communication interface 820, and the memory 830 communicate with each other through the bus 840. The communication interface 820 is configured to: send a helper initial key to a user equipment, so that the user equipment generates an initial user private key according to the helper initial key; and send a helper updated key for a time segment i to the user equipment, so that the user equipment updates a user private key according to the helper updated key. The processor 810 is configured to execute an instruction stored in the memory 830, where the processor 810 is configured to: randomly select a second parameter r from $Z^*_q$, generate a helper private key according to the second parameter r, and generate a helper initial key according to the helper private key and a preset first cryptographic hash function $H_1$, where $Z^*_q = \{1, 2, \ldots, q-1\}$, and q is a prime number; and update a helper updated key for a time segment i−1 according to the first cryptographic hash function $H_1$ to obtain a helper updated key for a time segment i, where i is an integer, i>0, an initial time segment is a time segment 0, and the helper initial key is a helper updated key for the time segment 0.

Persons of ordinary skill in the art may understand that all or a part of the steps of the foregoing method embodiments may be implemented by a program instructing relevant hardware. The foregoing program may be stored in a computer readable storage medium. When the program runs, the steps of the method embodiments are performed. The foregoing storage medium includes various mediums capable of storing program code, such as a ROM, a RAM, a magnetic disk, or an optical disc.

Finally, it should be noted that the foregoing embodiments are merely intended for describing the technical solutions of the present invention, rather than limiting the present invention. Although the present invention is described in detail with reference to the foregoing embodiments, persons of ordinary skill in the art should understand that they may still make modifications to the technical solutions described in the foregoing embodiments, or make equivalent replacements to some technical features in the technical solutions, as long as such modifications or replacements do not cause the essence of corresponding technical solutions to depart from the scope of the technical solutions of the embodiments of the present invention.

The invention claimed is:

1. A key insulation method, comprising:
generating, by a user equipment, an initial user private key according to a randomly selected parameter s, a preset first cryptographic hash function $H_1$, and a helper initial key generated by a helper device according to a helper private key and the first cryptographic hash function $H_1$; and
acquiring, by the user equipment, a helper updated key for a time segment i from the helper device, and updating by the user equipment a user private key for a time segment j according to the helper updated key for the time segment i to obtain a user private key for the time segment i, wherein i and j are integers, i>j≥0, an initial time segment is a time segment 0, the initial user private key is a user private key for the time segment 0, and the helper updated key for the time segment i is obtained by updating a helper updated key for a time segment i−1 according to the first cryptographic hash function $H_1$ by the helper device,
wherein the helper device is a device of higher security than the user equipment, the helper initial key is $UK_0 = rH_1(0)$, wherein r is the helper private key, r is randomly selected, $H_1$ is $\{0,1\}^* \rightarrow G_1$, $e: G_1 \times G_1 \rightarrow G_2$ is a bilinear pairing, and $G_1$ and $G_2$ are cyclic groups of an order q and the helper updated key for the time segment i is $UK_i = r(H_1(i) - H_1(i-1))$,
wherein the generating by the user equipment the initial user private key according to the parameter s, the preset first cryptographic hash function $H_1$, and the helper initial key includes:
generating by the user equipment the initial user private key $TSK_0$ by using the following formulas:

$TSK_0 = (s, US_0)$; and $US_0 = rH_1(0) + sH_1(0)$, and wherein the updating by the user equipment the user private key for the time segment j according to the helper updated key for the time segment i to obtain the user private key for the time segment i includes:
obtaining by the user equipment the user private key $TSK_i$ for the time segment i by using the following formulas:

$TSK_i = (s, US_i)$; and $US_i = US_j + UK_i + s(H_1(i) - H_1(j))$.

2. The key insulation method according to claim 1, wherein after randomly selecting the parameter s, the method further comprises:
acquiring, by the user equipment, a helper public key from the helper, generating by the user equipment a user public key according to the parameter s and the helper public key, and sending, by the user equipment, the generated user public key to a receiver device, wherein the helper public key is generated according to the helper private key.

3. The key insulation method according to claim 2, wherein the helper public key is $PK_H = rP$, wherein P is a generator of $G_1$; and
the generating by the user equipment the user public key according to the parameter s and the helper public key further comprises:
generating, by the user equipment, the user public key PK by using the following formulas:

$PK = (PK_H, P_{pub})$; and $P_{pub} = sP$.

4. The key insulation method according to claim 3, wherein after the sending the generated user public key to the receiver device, the method further comprises:
signing by the user equipment, according to the user private key for the time segment i, a received message which is to be signed, and sending, by the user equipment, the signed message to the receiver device, to enable the receiver device to authenticate the signed message according to the user public key.

5. The key insulation method according to claim 4, wherein the signing by the user equipment, according to the user private key for the time segment i, the received message which is to be signed, and sending, by the user equipment, the signed message to the receiver device, to enable the receiver device to authenticate the signed message according to the user public key further comprises:
generating by the user equipment, a signature σ for the message m, which is to be signed, according to the time segment i by using the following formulas:

σ = $(i, U, V)$; and $U=uP$, $V=US_i+uP_m$, and $P_m=H_2(i,m,U)$, wherein u is a number randomly selected, $H_2$ is a cryptographic hash function, and $H_2$ is $\{0,1\}^* \times \{0,1\}^* \times G_1 \to G_1$; and sending by the user equipment the signed message m and the signature σ to the receiver device, so that the receiver device calculates $P'_m=H_2(i,m,U)$ according to the user public key PK, the time segment i, the signed message m, and the signature σ, and the authentication succeeds if $e(P,V)=e(PK_H+P_{pub},H_1(i)) \cdot e(U,P'_m)$ is satisfied, wherein $e:G_1 \times G_1 \to G_2$ is a bilinear pairing.

6. A key insulation method, comprising:

generating by the helper device a helper private key according to a parameter r, generating by a helper device a helper initial key according to the helper private key and a preset first cryptographic hash function $H_1$, and sending by the helper device the helper initial key to a user equipment, to enable the user equipment to generate an initial user private key according to the helper initial key, wherein the parameter r is a function of $Z^*_q = \{1, 2, \ldots, q-1\}$, and q is a prime number; and updating by the helper device, a helper updated key for a time segment i−1 according to the first cryptographic hash function $H_1$ to obtain a helper updated key for a time segment i, and sending by the helper device the helper updated key for the time segment i to the user equipment, to enable the user equipment to update a user private key according to the helper updated key for the time segment i, wherein i is an integer, i>0, an initial time segment is a time segment 0, and the helper initial key is a helper updated key for the time segment 0, wherein the helper device is a device of higher security than the user equipment, wherein the generating by the helper device the helper private key according to the second parameter r, and generating by the helper device the helper initial key according to the helper private key and the preset first cryptographic hash function $H_1$ includes:

generating by the helper device, the helper initial key $UK_0$ by using the following formulas:

helper private key HK=r; and $UK_0=rH_1(0)$, wherein $H_1$ is $\{0,1\}^* \to G_1$, $e:G_1 \times G_1 \to_2$ is a bilinear pairing, and $G_1$ and $G_2$ are cyclic groups of an order q, and wherein the updating by the helper device the helper updated key for the time segment i−1 according to the first cryptographic hash function $H_1$ to obtain the helper updated key for the time segment i includes:

obtaining by the helper the helper device updated key $UK_i$ for the time segment i by using the following formula:

$UK_i=r(H_1(i)-H_1(i-1))$.

7. A user equipment, comprising a processor; a communication interface; a memory; and a bus, wherein the processor, the communication interface, and the memory communicate with each other through the bus, wherein the memory is configured to store an instruction, the communication interface is configured to acquire a helper initial key from a helper device, and acquire a helper updated key for a time segment i from the helper device, and the processor is configured to execute the instruction stored in the memory to perform the following:

generating an initial user private key according to a parameter s, a preset first cryptographic hash function $H_1$, and a helper initial key is generated by the helper device according to a helper private key and the first cryptographic hash function $H_1$; and updating a user private key for a time segment j according to the helper updated key for the time segment i to obtain a user private key for the time segment i, wherein i and j are integers, i>j≥0, an initial time segment is a time segment 0, the initial user private key is a user private key for the time segment 0, and the helper updated key for the time segment i is obtained by updating a helper updated key for a time segment i−1 according to the first cryptographic hash function $H_1$ by the helper device, wherein the helper device is a device of higher security than the user equipment, the helper initial key is $UK_0=rH_1(0)$, wherein r is the helper private key, r is randomly selected, $H_1$ is $\{0,1\}^* \to G_1$, $e:G_1 \times G_1 \to G_2$ is a bilinear pairing, and $G_1$ and $G_2$ are cyclic groups of an order q and the helper updated key for the time segment i is $UK_i=r(H_1(i)-H_1(i-1))$, wherein the generating the initial user private key according to the parameter s, the first cryptographic hash function $H_1$, and the helper initial key:

generating the initial user private key $TSK_0$ by using the following formulas:

$TSK_0=(s,US_0)$; and $US_0=rH_1(0)+sH_1(0)$, and wherein the updating the user private key for the time segment j according to the helper updated key for the time segment i to obtain the user private key for the time segment i includes:

obtaining the user private key $TSK_i$ for the time segment i by using the following formulas:

$TSK_i=(s,US_i)$; and $US_i=US_j+UK_i+s(H_1(i)-H_1(j))$.

8. The user equipment according to claim 7, wherein the communication interface is further configured to acquire a helper public key from the helper device, and the processor is further configured to generate a user public key according to the parameter s and the helper public key, and send the generated user public key to a receiver device, wherein the helper public key is generated according to the helper private key.

9. The user equipment according to claim 8, wherein the helper public key is $PK_H=rP$, wherein P is a generator of $G_1$, and the processor is further configured to generate the user public key PK by using the following formulas:

$PK=(PK_H,P_{pub})$; and $P_{pub}=sP$.

10. The user equipment according to claim 9, the processor is further configured to:

according to the user private key for the time segment i, a received message which is to be signed, and send the signed message to the receiver device, to enable the receiver device to authenticate the signed message according to the user public key.

11. The user equipment according to claim 10, wherein the processor is further configured to generate a signature σ for the message m, which is to be signed, according to the time segment i by using the following formulas:

$\sigma=(i,U,V)$; and $U=uP$, $V=US_i+uP_m$, and $P_m=H_2(i,m,U)$, wherein u is a number randomly selected, $H_2$ is a second cryptographic hash function, and $H_2$ is $\{0,1\}^* \times \{0,1\}^* \times G_1 \to G_1$; and send the signed message m and the signature σ to the receiver device, to enable the receiver device to calculate $P'_m=H_2(i,m,U)$ according to the user public key PK, the time segment i, the signed message m, and the signature σ, and the authentication succeeds if $e(P,V)=e(PK_H+P_{pub},H_1(i)) \cdot e(U,P'_m)$ is satisfied, wherein $e:G_1 \times G_1 \to G_2$ is a bilinear pairing.

12. A helper device, comprising a processor; a communication interface; a memory; and a bus, wherein the processor, the communication interface, and the memory communicate with each other through the bus, wherein the memory is configured to store an instruction, the communication interface is configured to send a helper initial key to a user equipment, so that the user equipment generates an initial user private key according to the helper initial key, and send a helper updated key for a time segment i to the user equipment, so that the user equipment updates a user private key according to the helper updated key for the time segment i, and the processor is configured to execute the instruction stored in the memory to perform the following:

generating a helper private key according to a parameter r, generating a helper initial key according to the helper private key and a preset first cryptographic hash function $H_1$, wherein the parameter r is randomly selected; and updating a helper updated key for a time segment i−1 according to the first cryptographic hash function $H_1$ to obtain a helper updated key for the time segment i, wherein i is an integer, i>0, an initial time segment is a time segment 0, and the helper initial key is a helper updated key for the time segment 0, wherein the helper device is a device of higher security than the user equipment, wherein the helper private key according to the parameter r, and generating the helper initial key according to the helper private key and the first cryptographic hash function $H_1$ includes:

generating the helper initial key $UK_0$ by using the following formulas:

helper private key $HK=r$; and $UK_0=rH_1(0)$, wherein $H_1$ is $\{0,1\}^* \to G_1$, $e:G_1 \times G_1 \to G_2$ is a bilinear pairing, and $G_1$ and $G_2$ are cyclic groups of an order q, and wherein the updating the helper updated key for the time segment i−1 according to the first cryptographic hash function $H_1$ to obtain the helper updated key for the time segment i includes:

obtaining the helper updated key $UK_i$ for the time segment i by using the following formula:

$$UK_i=r(H_1(i)-H_1(i-1)).$$

* * * * *

UNITED STATES PATENT AND TRADEMARK OFFICE
CERTIFICATE OF CORRECTION

PATENT NO. : 9,215,073 B2  
APPLICATION NO. : 14/243635  
DATED : December 15, 2015  
INVENTOR(S) : Cheng et al.

Page 1 of 1

It is certified that error appears in the above-identified patent and that said Letters Patent is hereby corrected as shown below:

IN THE CLAIMS

Column 16, line 57, "according to" should read -- sign, according to --.

Column 18, line 11, "wherein the helper private key" should read -- wherein the generating the helper private key --.

Signed and Sealed this  
Fifth Day of April, 2016

Michelle K. Lee  
*Director of the United States Patent and Trademark Office*